United States Patent
Chiruvella et al.

(10) Patent No.: US 7,687,720 B2
(45) Date of Patent: *Mar. 30, 2010

(54) INSULATED NON-HALOGENATED HEAVY METAL FREE VEHICULAR CABLE

(75) Inventors: Raman V. Chiruvella, Decatur, GA (US); Leonard A. Weiner, Cortland, OH (US); Eugene W. Yeager, Warren, OH (US); Daniel T. Quinlan, Brookfield, OH (US); Paul J. Pawlikowski, Cortland, OH (US); Edward L. Monroe, Cortland, OH (US); Bruce D. Lawrence, Cortland, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/215,012

(22) Filed: Jun. 24, 2008

(65) Prior Publication Data

US 2008/0271909 A1   Nov. 6, 2008

Related U.S. Application Data

(63) Continuation of application No. 11/473,648, filed on Jun. 23, 2006, now Pat. No. 7,408,116.

(51) Int. Cl.
*H01B 7/00* (2006.01)
(52) U.S. Cl. .................................................. 174/110 R
(58) Field of Classification Search ............. 174/110 R, 174/110 SR, 110 PM
See application file for complete search history.

(56) References Cited

U.S. PATENT DOCUMENTS

| | | | |
|---|---|---|---|
| 3,257,357 | A | 6/1966 | Stamatoff |
| 3,257,358 | A | 6/1966 | Stamatoff |
| 3,306,874 | A | 2/1967 | Hay |
| 3,306,875 | A | 2/1967 | Hay |
| 4,132,684 | A | 1/1979 | Izawa et al. |
| 4,797,453 | A | 1/1989 | Taubitz et al. |
| 5,475,041 | A | 12/1995 | Weil et al. |
| 5,521,009 | A | 5/1996 | Ishikawa et al. |
| 6,140,623 | A | 10/2000 | Boehnlein et al. |

(Continued)

FOREIGN PATENT DOCUMENTS

EP      0124916      11/1984

(Continued)

OTHER PUBLICATIONS

U.S. Appl. No. 11/483,788, filed Jul. 11, 2006, Mark A. Scheel et al.

(Continued)

*Primary Examiner*—Chau N Nguyen
(74) *Attorney, Agent, or Firm*—Thomas N. Twomey

(57) ABSTRACT

Described is an insulated non-halogenated, heavy metal free vehicular cable comprising an inner core of a copper based metal wire having a cross sectional area of at least about 0.1 $mm^2$, and an outer insulation, covering the length of the inner core, comprised of a thermoplastic polyphenylene ether composition that has no halogen or heavy metal added thereto, the insulated cable capable of meeting the testing standard ISO 6722.

15 Claims, 1 Drawing Sheet

U.S. PATENT DOCUMENTS

| | | | |
|---|---|---|---|
| 6,359,230 | B1 | 3/2002 | Hildreth |
| 6,849,016 | B2 | 2/2005 | Ashtiani et al. |
| 6,894,227 | B2 | 5/2005 | Kanamori et al. |
| 6,998,443 | B2 | 2/2006 | Lee et al. |
| 7,008,270 | B1 | 3/2006 | Huh et al. |
| 7,084,347 | B2 | 8/2006 | Mhetar et al. |
| 7,408,116 | B2 * | 8/2008 | Chiruvella et al. ...... 174/110 R |
| 2006/0131052 | A1 | 6/2006 | Mhetar et al. |
| 2006/0191706 | A1 | 8/2006 | Mhetar et al. |

FOREIGN PATENT DOCUMENTS

| | | |
|---|---|---|
| JP | 2005347099 | 12/2005 |
| WO | WO 2004014995 | 11/2004 |

OTHER PUBLICATIONS

Phelps Dodge High Performance Conductors, HPC Copper Alloy, Aug. 15, 2005, 4 pages, Inman, SC (U.S.A.).

GE Advanced Materials Plastics, Noryl Resin WCV072, Jul. 11, 2005, 3 pages.

GE Plastics, Noryl WCV072L-111, Mar. 3, 2006, 7 pages, Pittsfield, MA (U.S.A.) & Mississauga, Ont (Canada).

"GE Helps Delphi Lose Weight in Automotive Wire Coating . . .", article dated May 10, 2005, 3 pages.

Ryan Gehm, "GE Resin Enables Ligher, Smaller Cables", article dated Jul. 2005, 2 pages.

"Flexible PPE Alloy Debuts in Auto Wire Coating", article dated Jul. 2005, 1 page.

"Delphi's Halogen-Free Automotive Cable Making European Debut at Frankfurt Show", press release dated Sep. 13, 2005, 2 pages.

European Search Report dated Oct. 22, 2007.

Delphi Packard Marks First of Many "PPO" Milestones to Come. Jan. 5, 2005, 2 pages.

Delphi Supports Launch of GE's "Ecomagination" Initiative. May 12, 2005, 2 pages.

Delphi Packard Bringing Innovative PPO Cable to European Market. Jun. 28, 2005, 2 pages.

Division's Newly Named PPE Cable Receives "Green Light" from First Scheduled Customer. Oct. 4, 2005, 2 pages.

Delphi Packard's Innovative Halogen-Free Cable Highlighted at Joint Media Roundtable with GE. Oct. 4, 2005, 1 page.

"Moving Forward" with Toyota Continues with Another Win. Jan. 18, 2006, 2 pages.

Delphi Packard, General Electric Begin Pondering "What's Next?" Mar. 10, 2006, 2 pages.

Global Engineering: Delphi Halogen-Free Cable Team. May 31, 2006, 2 pages.

Materials: GE and Delphi to Announce Breakthrough. Automotive NewsWire. May 2, 2005, 4 pages.

Coating Offers Auto Makers Less Weight, Environmental Compliance, No Halogen Content. Wire & Cable Technology International. Jul. 2005, 1 page.

Rhoda Miel. GE, Delphi Team Up On Alternative Coating. Plastics News Staff. May 15, 2005, 1 page.

* cited by examiner

INSULATED NON-HALOGENATED HEAVY METAL FREE VEHICULAR CABLE

This application is a continuation of U.S. patent application Ser. No. 11/473,648 filed on Jun. 23, 2006 now U.S. Pat. No. 7,408,116. The disclosure of this earlier filed application is hereby incorporated by reference in its entirety.

TECHNICAL FIELD

The present invention is concerned with a vehicular cable that utilizes insulation that is non-halogenated and heavy metal free. In particular, the invention pertains to an automotive wire harness of a non-halogenated composition.

BACKGROUND OF THE INVENTION

Environmental regulations dictate that the material selection in the vehicular industry needs to be halogen free and heavy metal free compositions especially for the vehicular cables. Typically, polyvinyl chloride (PVC) is utilized because of its combination of competitive raw materials costs and desirable properties. These properties include processibility, toughness, chemical resistance and ability to withstand temperatures typical for many applications in automotive environments.

Unfortunately, the chlorine content of PVC limits its disposal at the end of the life of the vehicle. Also there are concerns about effects on health and the environment by PVC by-products and PVC plasticizer. Accordingly, therefore, a replacement for PVC has long been sought with an intent to find competitive cost efficient replacements. In addition, performance must be taken into account including high temperature endurance, toughness processability and also reduction in weight.

It is therefore desirable to have a material that is a vehicular cable insulation, is cost effective and still achieves desirable characteristics such as lack of halogens and heavy metals, appropriate conductivity, temperature resistance, scrape abrasion resistance, resistance to heat aging, resistance to automotive fluids and resistance to flame and in particular to be capable of meeting the standard ISO (International Organization for Standardization) 6722 and offers all these properties with a reduction in weight.

SUMMARY OF THE INVENTION

Described is an insulated non-halogenated, heavy metal free vehicular cable comprising an inner core of a copper based metal wire having a cross sectional area of at least about 0.1 mm$^2$, and an outer insulation, covering the length of the inner core, comprised of a thermoplastic polyphenylene ether composition that has no halogen or heavy metal added thereto, the insulated cable capable of meeting the testing standard ISO 6722.

BRIEF DESCRIPTION OF THE DRAWINGS

Further objects and advantages of the invention will be apparent from the following description and appended claims, reference being made to the accompanying drawings forming a part of the specification, wherein like reference characters designate corresponding parts in several views.

DETAILED DESCRIPTION OF THE INVENTION

With increasing electronic content in automobiles there is an ever growing need for miniaturizing the size of the cables that provide resistance to physical abuse and provide resistance to flame and automotive fluids among other requirements to be met for the automotive industry such as ISO 6722. It has been found to be particularly desirable to utilize an insulated non-halogenated, heavy metal free vehicular cable containing a copper based metal wire that has a diameter of at least about 0.1 mm or more and an outer insulation covering the length of the inner core comprised of a thermoplastic polyphenylene ether composition which has no halogen or heavy metal added thereto.

Definitions

By "non-halogenated" is meant that the polymeric material that is utilized has no halogen material that is added to the composition, as a desirable component of the composition.

By "heavy metal free" is meant that no heavy metal such as mercury, hexavalent chrome, cadmium, lead and the like are added to the metal core, as a desirable component of the metal composition.

By "copper based metal" is meant that the metal wire is comprised of greater than 50% by weight of the metal being copper, or copper alloyed with other metal components as is well known in the industry yet maintaining suitable electrical conductivity. Well known copper based alloys may be used such as HPC-80EF, trademark Phelps Dodge.

By "polyphenylene ether" is meant a thermoplastic polymeric material which is commercially available and generally are polymers of monohydroxy aromatic materials. Other readily available materials are 2,6-xylenol or a 2,3,6-trimethylphenyl and polymers thereof. Polyphenylene ether (PPE) is also known as polyphenylene oxide (PPO) and is described in the literature. See U.S. Pat. Nos. 3,306,874, 3,306,875; 3,257,357; and 3,257,358, which are herein incorporated by reference.

Frequently polyphenylene ether materials are a blend of other thermoplastic or cross-linked ethylenically unsaturated materials such as polyolefinic materials, styrene or styrene butadiene or polyacryamide and the like. These materials are commercially available such as Noryl, Luranyl, Ultranyl or Vestoblend, trademarks of GE. Some materials that may be utilized include Noryl WCV072, WCV072L-111, and the like of GE.

It has been found that the ultra thin cable and cable wall that is utilized in the present case even at a small cross section of 0.1 mm$^2$ give a very satisfactory result in abrasion cycling tests such as that called for in ISO-6722.

The cross sectional area of the copper wire can range from about 0.1 to about 3 square millimeters, such as 26 AWG to 12 AWG, alternatively 0.13 to 1.5 square millimeters.

Figure 3:
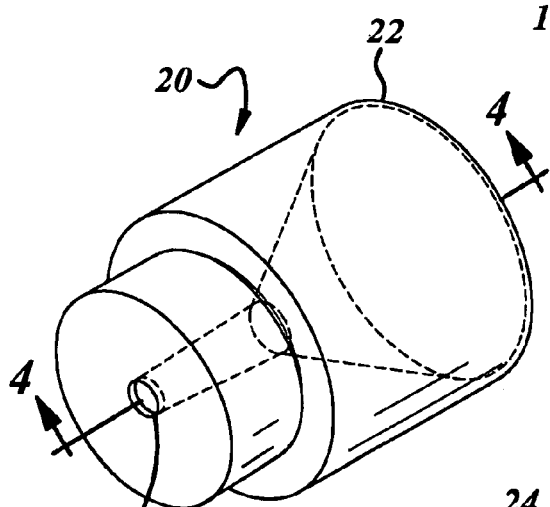
FIG. 3 is a die used to manufacture an embodiment of the insulated vehicular cable of the present invention.
Figure 4:
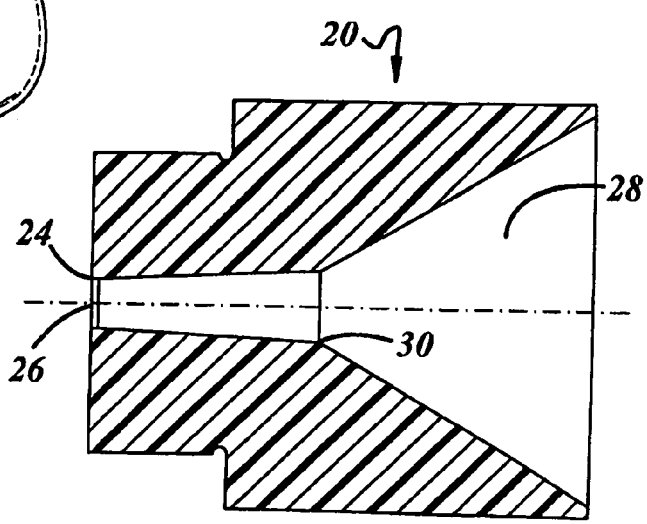
FIG. 4 is a cross-section of FIG. 3 taken along lines 4-4.

The insulated cable of the present invention is prepared utilizing normal well known commercially available equipment where the desired polyphenylene ether polymer is fed to an extrusion machine where the molten viscous polymer is passed through a die, as shown in FIGS. 3-4, so that the insulating PPE is wrapped around the linear portion of the metal conductor wire. The processing temperatures that may be utilized can vary as is well known in the industry. However, it has been found desirable to heat the resin material obtained from the supplier as follows. The thermoplastic polyphenylene ether material is dried at about 180° F. for at least 2 hours and is then passed through the first stage of an extrusion machine. The feed temperature is approximately 115° F. The compression temperature and the metering temperature in the barrels of the extruder can vary. A compression temperature may be from about 475° F. to 490° F. The metering temperature is approximately 500° F. to 540° F. The cross head or the die temperature is approximately 540° F. to 560° F. After the wire is extruded with the insulated material thereon, it passes through a cooling water bath and mist which is maintained at room temperature and then is packed as a cable in a barrel for subsequent handling.

Figure 1:
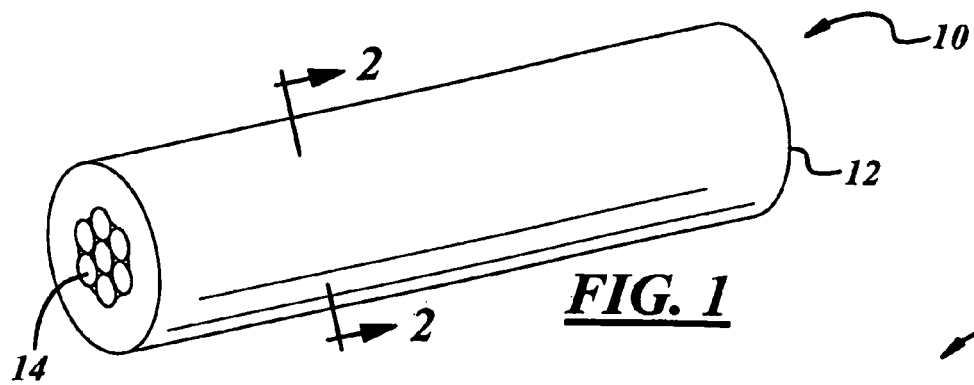
FIG. 1 is a perspective view of the vehicular cable of the present invention.
Figure 2:
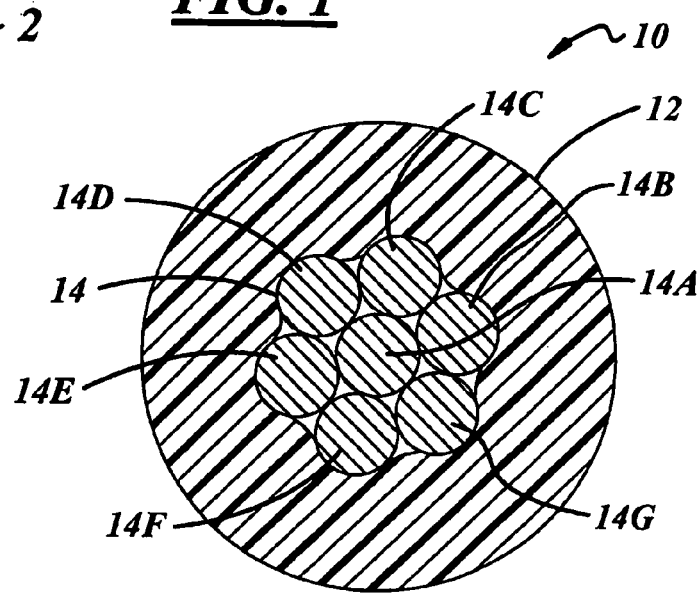
FIG. 2 is a cross-section of FIG. 1 taken along lines 2-2.

Turning now to a description of the drawings. FIG. 1 is the insulated vehicular cable 10 of the present invention having an insulated member 12 of PPE extruded or wrapped around the copper base metal core 14. An embodiment is shown in FIGS. 1 and 2 wherein the inner copper core is comprised of several wires 14 A-G with a central wire 14 A. The central wire 14A is surrounded by the other wires 14 B-G. There can be 7, 19 or 37 strands in metal core 14, in some instances they are compressed and in the other they are bunched.

During the extrusion process of the insulated vehicular cable 10, the copper based core is fed through the middle of die 20 entering the back end 22 of the die and exiting from the die at 24. The die has a central portion 26 through which the copper based wire 14 passes. The hot viscous PPE will be passed into the space 28 at the entrance end 22 of the die 20 and proceeds to envelop the copper wire. The die begins to narrow at 30 as PPE is extruded with the copper based wire passing from 30 through exit 24 of the die. At the exit 24 of the die, the insulated vehicular cable 10 of the present invention is obtained. The cooling process as described above and the packaging of the cable follows thereafter.

The diameter of the insulated vehicular cable 10 of the present invention can vary substantially. A cable diameter that has been found useful is between 0.85 and 0.92 mm in case of 0.13 mm$^2$ cable. Other dimensions of an insulated vehicular cable would be one that has approximately 0.13 square millimeters of wire as its cross sectional area but which is used to form the embodiment shown in FIG. 1 namely a central wire with six surrounding wires. In that case, the conductor diameter may be approximately 0.465 millimeters with a cable diameter 10 of approximately 0.88 millimeters with the minimum insulated wall thickness of 0.198 millimeters.

As indicated above a wide variety of commercially available extruding equipment may be utilized such as an extruder identified as BMD60-24D or a Nokia Maillefer, and the like.

The die utilized in the present invention may be manufactured from a wide variety of commercially available materials such as D2 hardened tool steel.

Following the procedures outlined in ISO-6722, scrape abrasion resistance using 7(N) load and 0.45 millimeter needle was used on three sets of cables, the first being compressed halogen free cable ISO ultra thin wall cable referred as CHFUS, the second ISO thin wall cable referred as HFSS and the third ISO thick wall cable referred as HF. The test results are identified in tables 1 and 2 below.

TABLE 1

| | CHFUS | | | | | | |
|---|---|---|---|---|---|---|---|
| | 0.13* | 0.22* | 0.35* | 0.50* | 0.75* | 1.00* | 1.25* |
| Normal Force(N) | 4.0 | 4.0 | 5.0 | 5.0 | 6.0 | 6.0 | 6.0 |
| Minimum cycles required at the normal force | 100 | 100 | 100 | 150 | 150 | 180 | 180 |
| Result | 166 | 550 | 338 | 376 | 536 | 526 | 1315 |
| 7N Load | 151 | 338 | 244 | 1150 | 836 | 960 | 2181 |
| | 125 | 379 | 223 | 458 | 1078 | 1171 | 610 |
| | 174 | 397 | 287 | 560 | 722 | 984 | 2673 |
| Minimum cycles attained by the cable at 7 Newton load | 125 | 338 | 223 | 376 | 536 | 526 | 610 |
| Pass/Fail | ○ | ○ | ○ | ○ | ○ | ○ | ○ |

*Wire Size (square mm)

TABLE 2

| | HFSS | | | | | | HF |
|---|---|---|---|---|---|---|---|
| | 0.35* | 0.50* | 0.75* | 1.00* | 1.25* | 2.00* | 3.00* |
| Normal Force(N) | 5.0 | 5.0 | 6.0 | 6.0 | 6.0 | 7.0 | 7.0 |
| Minimum cycles required at the normal force | 100 | 150 | 150 | 180 | 180 | 750 | 750 |
| Result | 443 | 4067 | 7193 | 6043 | 10434 | 12586 | *>5000 |
| 7N Load | 2396 | 893 | 9636 | 3896 | 5158 | 10835 | |
| | 830 | 4271 | 4512 | 7771 | 3559 | 11203 | |
| | 1031 | 2586 | 6198 | 8776 | 16333 | 12308 | |
| Minimum cycles attained by the cable at 7 Newton load | 443 | 893 | 4512 | 3896 | 3559 | 10835 | *>5000 |
| Pass/Fail | ○ | ○ | ○ | ○ | ○ | ○ | ○ |

*Wire Size (square mm)

Following the procedures outlined in ISO-6722 a number of tests were so performed where the cross sectional area of the copper wire varied as well as the diameter of insulated polyphyenelyene ether varied as is shown in tables 3-4.

TABLE 3

| Test | | Item | | Unit | Wire Thickness Area (square mm) | Cable Type and Size CHFUS Size | | | | | | | | |
|---|---|---|---|---|---|---|---|---|---|---|---|---|---|---|
| | | | | | | 0.13 | 0.22 | 0.35 | 0.50 | 0.75 | 1.00 | 1.25 | 1.50 | |
| ISO6722 | Certi-fication | Dimensions | Thickness of Ins. (min) | (mm) | | 0.179 | 0.274 | 0.190 | 0.211 | 0.194 | 0.196 | 0.210 | 0.223 | |
| | | | Cable Outer Dia. | (mm) | | 0.872 | 1.027 | 1.127 | 1.279 | 1.391 | 1.590 | 1.794 | 1.849 | |
| | | Electrical | Resistance | (mΩ/m) | Sec. 6.1 Must be smaller than requirement (Measured result) See Table 4 | 157.100 | 78.600 | 49.600 | 34.600 | 24.300 | 17.200 | 14.100 | 12.000 | |
| | | | | (mΩ/m) | Requirement | 169.900 | 84.400 | 54.400 | 37.100 | 24.700 | 18.500 | 14.900 | 12.700 | |
| | | | Ins. Resistance in water | | Sec. 6.2 Breakdown shall not occur | Pass | Pass | Pass | Pass | Pass | Pass | Pass | Pass | |
| | | | Spark test | | Sec. 6.3 No breakdown shall occur when the earthed cable is drawn through the test electrode | Pass | Pass | Pass | Pass | Pass | Pass | Pass | Pass | |
| | | Mechanical | Pressure test at high temp. | | Sec. 7.1 Breakdown shall not occur during the withstand voltage test | Pass | Pass | Pass | Pass | Pass | Pass | Pass | Pass | |
| | | Low-temp | Winding under low temp | | Sec. 8.1 After winding, no conductor shall be visible. During the withstand voltage test, breakdown shall not occur. | Pass | Pass | Pass | Pass | Pass | Pass | Pass | Pass | |
| | | Abrasion | Scrape | (N) | Sec. 9.3 Load requirement | 4 | 4 | 5 | 5 | 6 | 6 | 6 | 6 | |
| | | | | (times) | Scrape requirement | 100 | 100 | 100 | 150 | 150 | 180 | 180 | 200 | |
| | | | | (times) | Min. scrape result | 1309 | 3052 | 951 | 1636 | 441 | 844 | 883 | 1058 | |
| | | Heat aging | Short high temp | | Sec. 10.1 After winding, no conductor shall be visible. During the withstand voltage test, breakdown shall not occur. | Pass | Pass | Pass | Pass | Pass | Pass | Pass | Pass | |
| | | | Long high temp 85 deg C. | | Sec. 10.2 After winding, no conductor shall be visible. During the withstand voltage test, breakdown shall not occur. | Pass | Pass | Pass | Pass | Pass | Pass | Pass | Pass | |
| | | | Shrinkage by high temp | (mm) | Sec. 10.4 The maximum shrinkage shall not exceed 2 mm at either end | Pass | Pass | Pass | Pass | Pass | Pass | Pass | Pass | |
| | | Resistance to chemical | Gasoline | (%) | Sec. 11.1 The maximum outside cable diameter change shall meet the requirement shown in Table 13. After winding, no conductor shall be visible. During the withstand voltage test, breakdown shall not occur. | 5.15 | 5.40 | 0.09 | 2.83 | -6.39 | 0.06 | 0.00 | 0.32 | |
| | | | Diesel | (%) | | Pass | Pass | Pass | Pass | Pass | pass | Pass | Pass | |
| | | | | | | 4.56 | 4.72 | 8.63 | -0.58 | -0.40 | 6.20 | 3.55 | 1.88 | |
| | | | Engine Oil | (%) | | Pass | Pass | Pass | Pass | Pass | Pass | Pass | Pass | |
| | | | | | | 5.75 | 2.44 | 2.70 | -6.91 | -5.66 | -4.84 | 0.83 | 0.70 | |
| | | Flame | Flammability at 45 degree angle | (Sec) | Sec. 12 Any combustion flame of insulating material shall extinguish within 70s, and a minimum of 50 mm of insulation at the top of the test sample shall remain unburned | 0.0 | 0.0 | 0.0 | 0.0 | 0.0 | 0.0 | 4.0 | 4.0 | |
| If required | | Electrical | Insulation volume resistivity | Ohm mm | Sec. 6.4 Greater than 10⁹ Ohm mm | Pass 1.6E+15 | Pass 1.0E+16 | Pass 1.70E+16 | Pass 2.50E+21 | Pass 8.60E+17 | Pass 3.50E+21 | Pass 7.30E+17 | Pass 9.10E+19 | |

TABLE 3-continued

| Test | Item | Unit | Wire Thickness Area (square mm) | Cable Type and Size CHFUS Size | | | | | | | |
|---|---|---|---|---|---|---|---|---|---|---|---|
| | | | | 0.13 | 0.22 | 0.35 | 0.50 | 0.75 | 1.00 | 1.25 | 1.50 |
| Mechanical | Strip force | (N) | Sec. 7.2 Greater than specified by customer Requirement (Min) | 28.8 Pass | 31.6 Pass | 41 Pass | 69.7 Pass | 52.5 Pass | 75.7 Pass | 70.1 Pass | 63.8 Pass |
| Low-temp | Impact | | Sec. 8.2 After impact, no conductor shall be visible, During the withstand voltage test, breakdown shall not occur. | 2 Not required | 2 Not required | 5 Not required | 5 Not required | 5 Not required | 5 Not required | 5 Not required | 5 Not required |
| Heat aging | Thermal overload | | Sec. 10.3 After winding, no conductor shall be visible. During the withstand voltage, breakdown shall not occur | Pass | Pass | Pass | Pass | Pass | Pass | Pass | Pass |
| Resistance to chemical | Ethanol | (%) | Sec. 11.1 The maximum outside cable diameter change shall meet the requirement shown in Table 13. After winding, no conductor shall be visible. During the withstand voltage test, breakdown shall not occur. | 4.01 Pass | 4.42 Pass | 2.70 Pass | −6.98 Pass | −6.06 Pass | −5.26 Pass | 1.33 Pass | 1.61 Pass |
| | Power steering fluid | (%) | | 4.00 | 6.39 | 3.68 | 5.76 | −4.73 | −3.48 | 1.33 | 3.71 |
| | Automatic transmission fluid | (%) | | Pass | Pass | Pass | Pass | Pass | Pass | Pass | Pass |
| | Engine coolant | (%) | | 4.07 Pass | 5.52 Pass | 4.31 Pass | 6.05 Pass | −2.46 Pass | −3.96 Pass | 2.11 Pass | 1.51 Pass |
| | Battery | (%) | | 3.09 Pass | 0.29 Pass | 0.99 Pass | 1.65 Pass | −0.20 Pass | 0.06 Pass | 0.44 Pass | −0.32 Pass |
| | Ozone | | Sec. 11.3 The visual examination of the insulation shall not reveal any cracks | −0.11 | 1.48 | 1.08 | 2.12 | −1.00 | 0.24 | 0.00 | −0.32 |
| | Hot water | (Ω · mm) | Sec. 11.4 The insulation volume resistivity shall not be less than $10^9$ Ohm mm. A visual examination of the insulation | | | | Pass | Pass | | | |
| | Temp. and humidity cycling | | Sec. 11.5 After winding, no conductor shall be visible. During the withstand voltage test, breakdown shall not occur | Pass | Pass | Pass | Pass | Pass | Pass | Pass | Pass |

TABLE 4

| Test | | Item | | Unit | Wire Thickness Area (square mm) | Cable Type and Size | | | | | | | |
|---|---|---|---|---|---|---|---|---|---|---|---|---|---|
| | | | | | | 0.35 | 0.50 | 0.75 | HFSS Size 1.00 | 1.25 | 2.00 | PPO HF Size 3.00 | |
| ISO6722 | Certification | Dimensions | Thickness of Ins. (min) | (mm) | | 0.258 | 0.231 | 0.252 | 0.322 | 0.320 | 0.348 | 0.653 | |
| | | | Cable Outer Dia. | (mm) | | 1.289 | 1.481 | 1.773 | 1.943 | 2.088 | 2.551 | 3.598 | |
| | | Electrical | Resistance | (mΩ/m) | Sec. 6.1 Must be smaller than requirement (Measured result) See Table 4 | 46.200 | 33.100 | 23.200 | 16.800 | 13.900 | 8.840 | 5.76 | |
| | | | | (mΩ/m) | Requirement | 54.400 | 37.100 | 24.700 | 18.500 | 14.900 | 9.420 | 6.150 | |
| | | | Ins. Resistance in water | | Sec. 6.2 Breakdown shall not occur | Pass | Pass | Pass | Pass | Pass | Pass | Pass | |
| | | | Spark test | | Sec. 6.3 No breakdown shall occur when the earthed cable is drawn through the test electrode | Pass | Pass | Pass | Pass | Pass | Pass | Pass | |
| | | Mechanical | Pressure test at high temp. | | Sec. 7.1 Breakdown shall not occur during the withstand voltage test | Pass | Pass | Pass | Pass | Pass | Pass | Pass | |
| | | Low-temp | Winding under low temp | | Sec. 8.1 After winding, no conductor shall be visible. During the withstand voltage test, breakdown shall not occur. | Pass | Pass | Pass | Pass | Pass | Pass | Pass | |
| | | Abrasion | Scrape | (N) (times) (times) | Sec. 9.3 Load requirement Scrape requirement Min. scrape result | 5 100 1688 | 5 150 2141 | 6 150 >5000 | 6 180 >5000 | 6 180 >5000 | 7 750 10835 | 7 750 >5000 | |
| | | Heat aging | Short high temp | | Sec. 10.1 After winding, no conductor shall be visible. During the withstand voltage test, breakdown shall not occur. | Pass | Pass | Pass | Pass | Pass | Pass | Pass | |
| | | | Long high temp 85 deg C. | | Sec. 10.2 After winding, no conductor shall be visible. During the withstand voltage test, breakdown shall not occur. | Pass | Pass | Pass | Pass | Pass | Pass | Pass | |
| | | | Shrinkage by high temp | (mm) | Sec. 10.4 The maximum shrinkage shall not exceed 2 mm at either end | Pass | Pass | Pass | Pass | Pass | Pass | Pass | |
| | | Resistance to chemical | Gasoline | (%) | Sec. 11.1 The maximum outside cable diameter change shall meet the requirement shown in Table 13. After winding, no conductor shall be visible. During the withstand voltage test, breakdown shall not occur. | −4.79 | −4.54 | −3.57 | 2.07 | 2.23 | 6.77 | 13.4 | |
| | | | Diesel | (%) | | Pass −3.50 | Pass −2.71 | Pass −1.65 | Pass 3.16 | Pass −2.00 | Pass 2.20 | Pass 1.63 | |
| | | | Engine Oil | (%) | | Pass −6.36 | Pass −5.74 | Pass 1.17 | Pass 2.19 | Pass −3.91 | Pass 0.94 | Pass 0.14 | |
| | | Flame | Flamability at 45 degree angle | (Sec) | Sec. 12 Any combustion flame of insulating material shall extinguish within 70 s and a minimum of 50 mm of insulation at the top of the test sample shall remain unburned | 0.0 | 0.0 | 4.0 | 5.0 | 4.0 | 8.0 | 14 | |
| | If required | Electrical | Insulation volume resistivity | Ohm mm | Sec. 6.4 Greater than $10^9$ Ohm mm | Pass 2.90E+21 | Pass 7.70E+17 | Pass 8.30E+16 | Pass 2.80E+16 | Pass 3.20E+16 | Pass 9.70E+16 | Pass 3.40E+21 | |

TABLE 4-continued

| Test | Item | | Unit | Wire Thickness Area (square mm) | Cable Type and Size | | | | | | | |
|---|---|---|---|---|---|---|---|---|---|---|---|---|
| | | | | | 0.35 | 0.50 | HFSS Size 0.75 | 1.00 | 1.25 | 2.00 | PPO HF Size 3.00 |
| Mechanical | Strip force | | (N) | Sec. 7.2 Greater than specified by customer Requirement (Min) | 63 Pass 5 | 115.35 5 | 69.4 Pass 5 | 8.0 Pass 5 | 112 Pass 5 | 113.3 Pass 10 | 230 15 |
| Low-temp | Impact | | | Sec. 8.2 After impact, no conductor shall be visible. During the withstand voltage test, breakdown shall not occur. | Not required | Not required | Pass | Pass | Pass | Pass | Pass |
| Heat aging | Thermal overload | | | Sec. 10.3 After winding, no conductor shall be visible. During the withstand voltage, breakdown shall not occur | Pass | Pass | Pass | Pass | Pass | Pass | Pass |
| Resistance to chemical | Ethanol | | | Sec. 11.1 The maximum outside cable diameter change shall meet the requirement shown in Table 13. After winding, no conductor shall be visible. During the withstand voltage test, breakdown shall not occur. | Pass | Pass | Pass | Pass | Pass | Pass | Pass |
| | Power steering fluid | | (%) | | 5.93 Pass | −5.36 Pass | 1.17 Pass | 5.97 Pass | −3.82 Pass | 1.45 Pass | 1.3 Pass |
| | Automatic transmission fluid | | (%) | | −5.36 Pass | −3.72 Pass | −3.52 Pass | 6.99 Pass | −2.64 Pass | 2.08 Pass | 0.36 Pass |
| | Engine coolant | | (%) | | −5.65 Pass | −4.61 Pass | −3.09 Pass | 6.99 Pass | −2.55 Pass | 1.92 Pass | 0.58 Pass |
| | Battery | | (%) | | −7.22 Pass 0.78 | 0.13 Pass −0.19 | −5.54 Pass −0.32 | −1.17 Pass 5.00 | 0.00 Pass 0.38 | 0.74 Pass −0.04 | 0.64 Pass 0 |
| | Ozone | | | Sec. 11.3 The visual examination of the insulation shall not reveal any cracks | | | | Pass | | | |
| | Hot water | | (Ω · mm) | Sec. 11.4 The insulation volume resistivity shall not be less than $10^9$ Ohm mm. A visual examination of the insulation | | | | Pass | Pass | | |
| | Temp. and humidity cycling | | | Sec. 11.5 After winding, no conductor shall be visible. During the withstand voltage test, breakdown shall not occur | Pass | Pass | Pass | Pass | Pass | Pass | Pass |

We claim:

1. An insulated non-halogenated, heavy metal free vehicular cable comprising:
   an inner core of a copper based metal wire having a cross sectional area of 0.1 mm$^2$ to 0.13 mm$^2$;
   an outer insulation, covering the length of the inner core, comprised of a thermoplastic polyphenylene ether composition that has no halogen or heavy metal added thereto, wherein the polyphenylene ether comprises a polymer formed from a ethylenically unsaturated material, the insulation having improved abrasion resistance; and
   wherein the insulated cable is constructed and arranged to withstand flame at a 45 degree angle such that any combustion flame of the outer insulation extinguishes within 70 seconds and a minimum of 50 mm of insulation at the top of the insulated cable remains unburned, and to have a scrape abrasion resistance of greater that 100 cycles using a 7 N load and a 0.45 millimeter needle.

2. The insulated cable of claim 1 in the form of an automobile wire harness.

3. The insulated cable of claim 1 wherein the inner core of the copper based metal wire has a cross sectional area of 0.13 mm$^2$.

4. The insulated cable of claim 1 wherein the ethylenically unsaturated material comprises an olefinically unsaturated material.

5. The insulated cable of claim 1 wherein the ethylenically unsaturated material comprises a styrene butadiene material.

6. An insulated vehicle cable comprising:
   a copper based metal core that has a cross sectional area of about 0.13 mm$^2$;
   an insulation layer that covers the copper based metal core, the insulation layer comprising a thermoplastic polyphenylene ether material that is free of halogens and heavy metals; and
   wherein the copper based metal core and the insulation layer provide the insulated vehicle cable with a diameter from about 0.85 mm to about 0.92 mm.

7. The insulated vehicle cable of claim 6 wherein the insulation layer has a thickness of about 0.179 mm.

8. The insulated vehicle cable of claim 6 wherein the insulation layer has a thickness of about 0.198 mm 9. The insulated vehicle cable of claim 6 wherein the vehicle cable can withstand flame at a 45 degree angle such that any combustion flame of the outer insulation extinguishes within 70 seconds and a minimum of 50 mm of insulation at the top of the insulated cable remains unburned, and has a scrape abrasion resistance of greater than 100 cycles using a 7N load and a 0.45 millimeter needle.

10. The insulated vehicle cable of claim 6 wherein the copper based metal core comprises a plurality of copper wires.

11. The insulated vehicle cable of claim 6 wherein the polyphenylene ether material is a polymer of monohydroxy aromatic compounds.

12. The insulated vehicle cable of claim 11 wherein the monohydroxy aromatic compounds comprise 2,6-xylenol.

13. The insulated vehicle cable of claim 11 wherein the monohydroxy aromatic compounds comprise 2,3,6-trimethylphenyl.

14. The insulated vehicle cable of claim 6 wherein the polyphenylene ether material comprises a polymer formed from an ethylenically unsaturated material.

15. The insulated vehicle cable of claim 14 wherein the polymer formed from an ethylenically unsaturated material comprises a blend of one or more of a polyolefin, styrene, styrene butadiene, and a polyacryamide.

* * * * *